(12) United States Patent
Tomasula

(10) Patent No.: US 6,379,726 B1
(45) Date of Patent: Apr. 30, 2002

(54) EDIBLE, WATER-SOLUBILITY RESISTANT CASEIN MASSES

(75) Inventor: Peggy M. Tomasula, Titusville, NJ (US)

(73) Assignee: The United States of America as represented by the Department of Agriculture, Washington, DC (US)

( * ) Notice: Subject to any disclaimer, the term of this patent is extended or adjusted under 35 U.S.C. 154(b) by 0 days.

(21) Appl. No.: 09/420,963

(22) Filed: Oct. 20, 1999

(51) Int. Cl.$^7$ .................................................. A23B 4/10
(52) U.S. Cl. ........................ 426/89; 426/138; 426/302; 426/656
(58) Field of Search ................................ 426/138, 656, 426/89, 302

(56) References Cited

U.S. PATENT DOCUMENTS

| | | | | |
|---|---|---|---|---|
| 4,519,945 A | * | 5/1985 | Ottenhof | 260/119 |
| 5,543,164 A | * | 8/1996 | Krochta et al. | 426/302 |
| 5,545,411 A | * | 8/1996 | Chancellor | 424/439 |
| 5,603,952 A | * | 2/1997 | Soper | 424/456 |
| 5,681,517 A | * | 10/1997 | Metzger | 264/202 |
| 5,882,705 A | * | 3/1999 | Sato et al. | 426/41 |
| 6,120,592 A | * | 9/2000 | Brault et al. | 106/140.3 |

OTHER PUBLICATIONS

A. Frinault et al. "Preparation of Casein Films by a Modified Wet Spinning Process", Journal of Food Science, vol. 62(4), 1997.*

Tomasula, P.M., et al., "Properties of Films Made From CO2–Precipitated Casein", *Journal of Agricultural and Food Chemistry*, vol. 46, 4470–4474, (1998).*

* cited by examiner

*Primary Examiner*—Lien Tran
(74) *Attorney, Agent, or Firm*—M. Howard Silverstein; Curtis P. Ribando; John D. Fado

(57) ABSTRACT

An edible, water-resistant composition that can be formed into shaped articles including film comprises a water-resistant solid composition of casein. The casein composition may be directly precipitated from a solution under high pressure treatment with carbon dioxide. The composition does not have to be crosslinked, but takes advantage of the natural water-insolubility of the protein backbone of the casein. The casein composition may be combined with edible or inert flexibilizers to improve film properties, and the film may be used to protect food products or food compositions, yet provide moisture protection. The film of casein material may exhibit water-insolubility in deionized water at 20° C. of less than 25% by weight after two hours of immersion of the film in the deionized water, with or without mild agitation.

8 Claims, No Drawings

EDIBLE, WATER-SOLUBILITY RESISTANT CASEIN MASSES

BACKGROUND OF THE INVENTION

1. Field of the Invention

The present invention relates to the field of casein materials, casein compositions, and methods of manufacturing casein in an edible form that is also resistant to dissolving in neutral or basic aqueous systems.

2. Background of the Art

Casein comprises a group of proteins that forms about 80 percent of the total proteins in cow's milk. It solidifies when milk is made slightly acidic and is the chief ingredient in cheese. Casein is used as a food supplement, an adhesive, and a finishing material for paper and textiles. It is also used in water paints. Consumer demands for both higher quality and longer shelf-life foods have stimulated edible film research. The environmental movement has promoted increased concern about reducing disposable packaging amounts and increasing packaging recyclability, farther contributing to the recent surge in edible coating and film research. Edible films and coatings are capable of offering solutions to these concerns by regulating the mass transfer of water, oxygen, carbon dioxide, lipid, flavor, and aroma movement in food systems. Edible coatings function by direct adherence to food products; whereas, edible films act as stand-alone sheets of material used as wrappings, low moisture baked products, and intermediate and high moisture foods all exhibit potential for improvement through the use of edible coatings and films. Dried foods (e.g., dried vegetables and dried meats) and low moisture baked products (e.g., crackers, cookies and cereals) are particularly susceptible to moisture uptake from the atmosphere. Low moisture baked foods are also susceptible to moisture uptake from moist fillings and toppings. Such changes can result in loss of sensory acceptability of the food product, as well as a reduced shelf-life. Many dried and baked products are also susceptible to oxidation, lipid migration and volatile flavor loss.

Intermediate moisture foods, such as raisins and dates, often become unacceptable due to moisture loss over time. Moisture loss is particularly problematic when the moisture transfers into lower moisture components of a food system, For example, raisins can lose moisture to the bran in raisin bran. Nut meats, another intermediate moisture food, are susceptible to lipid oxidation resulting in the development of off flavors. High moisture food components typically lose moisture to lower moisture components. One classical example of this phenomenon occurs when pizza sauce moisture migrates into the crust during storage, resulting in a soggy crust. Oxidation and flavor loss are also problematic to high moisture food systems. The respiration rates of whole fruits and vegetables often dictate their shelf lives. Minimally processed fruits and vegetables are often subject to unacceptable levels of oxidative browning. Individual food products within the broad food categories discussed above require different barrier properties in order to optimize product quality and shelf-life. Edible films and coatings are capable of solving the barrier problems of these and a variety of other food systems. See, Kester, et al., Food Technol. 40:47–59 (1986) and Krochta, in Advances in Food Engineering, CRC Press, Inc., Boca Raton, Fla. Singh and Wirakartakusumab (Eds.) p. 517–538 (1992).

Edible films and coatings based on water-soluble proteins are typically water-soluble themselves and exhibit excellent oxygen, lipid and flavor barrier properties; however, they are poor moisture barriers. Additionally, proteins act as a cohesive, structural matrix in multicomponent systems to provide films and coatings having good mechanical properties. Lipids, on the other hand, act as good moisture barriers, but poor gas, lipid, and flavor barriers. By combining proteins and lipids in emulsion or bilayer barriers, the advantages of each component can be exploited to form an improved film system. Plasticizer addition improves film mechanical properties. It would be desirable to be able to provide water-insoluble protein films, even if they do not necessarily provide oxygen barriers.

The harvesting of casein from milk utilizing either acid or an enzyme precipitation while efficient for recovering the casein protein from the milk, does not recover any whey protein. After acid or enzyme precipitation of casein from milk, normally the whey fraction is discarded. This thus constitutes a waste of some of the protein content of the milk, even though the utilization of the whey has improved over the years. It has been suggested as, for instance, Phillips, et al. U.S. Pat. No. 4,218,490, to harvest the whey protein content of milk utilizing ion exchange resins.

U.S. Pat. No. 4,545,933 entitled Hydrolyzed Protein Composition and Process Utilized in Preparation Thereof describes a process for hydrolyzing casein protein utilizing caustic solutions of sodium or potassium hydroxide. The hydrolyzed protein produced by the process of this patent has certain unique properties which are useful in the preparation of certain processed food products. The starting materials suggested for the process of U.S. Pat. No. 4,545, 933 is acid precipitated casein, that is casein which contains no whey protein.

The properties of composite bilayer films and coatings have been studied in the past. Cohesive bilayer films and coatings are often difficult to form and delamination may occur over time. Furthermore, bilayer film and coating formation often requires the use of solvents or high temperatures, making production more costly and less safe than aqueous emulsion film production. Protein-lipid emulsion film and coating systems can be formed from aqueous solutions and applied to foods at room temperature.

Water-insoluble edible films and coatings offer numerous advantages over water-soluble edible films and coatings for many food product applications. Increasing levels of covalent crosslinking in water-insoluble edible films and coatings result in better barriers to water, although not necessarily barriers to oxygen, carbon dioxide, lipids, flavors and aromas in food systems. Film mechanical properties are also improved. Many foods, such as fruits and vegetables, are exposed to water during shipping and handling. In these cases, water-insoluble films and coatings remain intact; whereas, water-soluble films and coatings dissolve and lose their barrier and mechanical properties. Edible films in the form of wraps, such as sandwich bags, also require water-insolubility.

Prior to this invention, water-soluble, protein-based edible films and coatings have been formed from aqueous solutions of proteins (Gennadios, et al., in Edible Coatings and Films to Improve Food Quality, Technomic Publishing Co., Lancaster, Pa., Krochta, Baldwin and Nisperos-Carriedo (Eds.), Chapter 9, (1994)); however, a means to produce water-insoluble films and coatings from aqueous solutions with improved barrier properties had not been discovered. Carmelization and/or Maillard browning reactions had been exploited for the formation of improved protein-based oxygen barrier coatings for fruits and vegetables (Musher, U.S. Pat. No. 2,282,801). Protein thiol-disulfide interchange and free thiol oxidation reactions had been studied previously (see Donovan, et al., J. Food Sci. and Technol. 11:87–100 (1987) and Shimada, et al., J. Agric. Food Chem. 37:161–168 (1989)). However, the use of these reactions for the formation of new and improved edible barriers had not been explored. Edible moisture barrier coatings had been formed out of protein-based aqueous emulsions (see, Adams, et al., EP 0 465 801 Al and Ukai, et al., U.S. Pat. No. 3,997,674). However, methods for the formation of water-insoluble protein-based films and coatings had not been discovered.

Others have studied the interactions between proteins and lipids at interfaces in emulsions and colloidal systems. See, Barford, et al., in Food Proteins, American Oil Chemists Society, Kinsella and Soucie, eds., (1989) and Le Meste, et al., in Interactions of Food Proteins, American Chemical Society, Washington, D.C., Parris and Barford, eds., (1991). However, regulation of mass transfer as a function of lipid particle size and distribution in films has not been explored.

What is needed is a method for preparing water-insoluble protein-based edible films and coatings from casein that exhibit improved water-solubility resistance, and barrier and mechanical properties.

Industrial application of casein, which is the major component of milk proteins, has been studied in many fields. Although some of these studies are actually practiced in industries, the amount of casein used in these applications is limited. The reason is that casein is difficult to be molded, extruded, or worked, and its physical properties are limited by its water-solubility. These physical limitations are in part a result of the fact that this protein easily forms a stable micelle structure due to its macromolecular surface activity.

Casein protein is a phosphoprotein possessing a macromolecular surface activity which enables the protein to form a micelle structure. The micelle structure renders casein stable in milk. When separated from milk, casein will form globular micelles if an alkaline earth metal, such as calcium or magnesium, is present. Such globular micelles are difficult to disperse in a medium and difficult to mold.

There have been several proposals for dispersing casein, however, none brought about good results. For example, Japanese Patent Laid-open (kokai) No. 138145/1987 discloses a method of dissolving caseinate in an ethanol aqueous solution and making films by fluid spreading (which might be a casting method). However, caseinate becomes too hard when heated in a drying step, preventing it from being formed into fibers or films. This method therefore has not been industrially successful. Journal of Japan Agrichemical Society, 61, 1087–1092 (1987) proposes a method of dissolving or dispersing casein molecules by breaking down the micelle structure in a casein solution. The method involves treating the casein solution with a chelating resin, thereby removing the metals, e.g. calcium, from the casein solution. The report states that after the treatment, the casein molecules form sub-micelles, but does not describe how the sub-micelles can be used.

Casein protein is a water-soluble macromolecular surfactant consisting of hydrophobic protein and hydrophilic phosphoric acid groups, the latter groups rendering the protein more soluble in acid solutions. The phosphoric acid groups are bonded to counterions, i.e. metals such as calcium and magnesium, which induce the protein to form globular micelles. This configuration makes casein molecules difficult to orient in the longitudinal direction necessary to obtain an acceptable fiber. Obtaining fibers and other molded articles with acceptable mechanical properties from casein, therefore, has not been successful.

The properties and structure of the casein molecule include characterizations as millions of particles/cc with an average path of 0.37 micrometers between particles. The Molecular Weight varies from 10 to 3280 million, and the shape of the molecule is likely spherical. The Composition Size of micelles depends on initial s:k-casein (sigma/kappa) ratio, absolute protein concentration and $Ca^{++}$ concentration. If micelles are removed by ultracentrifugation, the sediment is a clear gel. When dispersed in water, get an opaque colloidal suspension. It is highly hydrated, with about 2.5 grams water/gm. protein. All casein subunits are accessible to high molecular weight reagents and the association of subunits is through noncovalent bonds.

The principal solid constituent of milk is casein, a protein. When milk is allowed to stand in a warm place, it sours, and the casein is precipitated by the action of lactic acid bacteria. The thick precipitate, or curd, is separated from the thin, watery residue known as whey. Today curd is usually prepared with rennet, which acts to speed the separation process. The next steps in the making of cheese are salting (for flavor and eventually to aid in curing) and pressing (to shape the cheese and eliminate more whey). The curd is then ready for curing and is stored under temperature- and humidity-controlled conditions for varying lengths of time. In general, the longer the curing or aging process, the more pronounced the flavor of the finished product. During curing, gases are formed within the cheese, and in some types they are unable to escape; this produces the holes characteristic of some cheeses. To aid the curing process, harmless blue-mold spores are introduced into the blue-veined cheeses (Roquefort or blue cheese), and white-mold spores are sprayed on the surface of such cheeses as Brie and Camembert. This produces a rind, which may be eaten. Cheese casein is not a preferred source of casein in the practice of the present invention.

Casein may be derived from any original source and may be prepared by conventional methods can be used as the raw material in the present invention without any specific limitations. Casein is the principal protein in milk (whether, fresh cow milk, fresh goat milk or non-fat dried milk, ultrafiltered milk, other available milk forms and sources, and exists in milk as a colloidal aggregate of protein together with phosphorus and calcium. Other metal ions, such as magnesium, also may be present. Casein most useful in the present invention may be precipitated from milk by the addition of $CO_2$ to cause precipitation.

In an optional initial series of steps in the present method, the casein may be treated to remove some of the calcium and any other forms of metals which may be present, although some calcium must remain to provide some structure to the film. This may be accomplished by any method effective for selectively removing metal ions, such as, for example, ion-exchange or chelation. A preferred method of removing the metals comprises contacting an aqueous solution or dispersion of casein with a chelating agent. Any chelating agent may be used in the method, however resins having fixed chelating functional groups are preferred. Chelating resins having iminodiacetic acid groups as functional groups are most preferably used as the chelating resin. A method for removing metal ions from casein using a chelate-functional resin which is described in said report of Journal of Japan Agrichemical Society, supra. Preferably, the carboxyl terminals of the iminodiacetic acid groups in the resin comprise hydrogen ions ($H^+$). H-type resins are preferred because in order to ensure complete removal of metal ions from the casein, therefore the absence of alkali metals such as sodium at the functional group terminal is imperative. An iminodiacetic acid functional resin which is useful in the present invention, for example, is Uniselex.™. UR30 (trademark, manufactured by Unitica Co., Ltd.). This step is carried out by contacting an aqueous casein solution with the chelating resin under conditions appropriate to remove some all of the metal ions from the casein solution, thereby forming sub-micellular casein. Sub-micellular casein thus obtained may be dried by a conventional method, if desired.

According to the present invention casein, which has been heretofore difficult to form into molded articles such as fibers, films, or the like, can be easily molded and manufactured into regeneration films, and it is readily predictable that fibers and other articles made of natural casein proteins may be made from the materials of the present invention. Casein fibers can be woven into cloth or sheets which are useful for various applications. In addition, because the raw material (casein) is naturally found in milk, articles made according to the invention that may be used as food materials, such as edible fibers. Casein is a naturally occurring material which is biodegradable, therefore, articles made from casein fibers or films contribute to global environment conservation. Casein films, non-woven fabrics of casein fibers or woven fibers and yarns, for example, could be used to make biodegradable packaging materials.

In an attempt to improve the structural stability of articles made from starch-based compositions, other ingredients have been included in the formulations. For example, compositions have been developed that include starch in combination with a water-insoluble synthetic polymers. Unmodified starches have also been combined with protein to provide moldable, biodegradable thermoplastic compositions. For example, Nakatsuka et al. (U.S. Pat. No. 4,076,846; issued Feb. 28, 1978) discloses an edible binary protein-starch molding composition containing a salt of a natural protein (i.e., casein), an unmodified, high amylose starch material, an edible plasticizer (i.e., sorbitol), and a lubricant (i.e., a fatty acid polyol ester), and having a final water content of about 10–40%. The composition is molded, for example, by extrusion through a die, into an article having a water content of about 5–30 wt-%. A disadvantage of these starch-based plastics is that the molded articles made from such compositions have a high tendency to absorb water, which causes the articles to lose mechanical strength and to disintegrate quickly.

U.S. Pat. No. 5,543,164 describes a method of forming an edible, protein-based water-insoluble film by treating a solution of the protein to effect disulfide formation and a denatured protein solution, then forming the denatured protein solution into a film. The denaturing is effected by causing a thiol-disulfide exchange by heat treatment and/or chemical reaction, e.g., heating between 70 and 95 degrees Celsius for up to three hours to initiate disulfide crosslinking reactions. These relatively high temperatures are essential for enabling the crosslinking to occur. The casein referred to here is probably calcium or sodium caseinate, usually manufactured by adding calcium or sodium hydroxide to acid casein (e.g., manufactured by the HCl process) and heated to at least about 75 degrees C. This type of calcium caseinate will have approximately the same molar proportions of casein with natural calcium therein, but the calcium in the calcium caseinate does not hold the micelles together as occurs with the natural calcium. The use of the vacuum is to assist in the removal of air bubbles that tend to get trapped in film after mixing, pouring or other mechanical procedures.

Conventional concentrating processes depend upon direct chemical treatment of the source vegetable matter to concentrate the protein. For example, raw soy products such as soy meal, soy flakes, and soy flour are treated with acid (e.g., hydrochloric acid) to precipitate protein and separate the protein from whey, sugars, oils and proteins which will not precipitate. Some of the acid remains in the protein precipitate and must be removed by additional processing either specific or generic to removal of the acid residue. As the acid is undesirable from many standpoints of flavor, aesthetics and health, it is desirable that in at least some uses that substantially all of the acid (reduced to an acid level of less than 0.5% by weight) is removed. The processing necessary to do this may be sufficiently harsh as to reduce the value and content of the soy protein concentrate or soy protein isolate produced by the acid treatment process.

There are also many physical processes for producing protein-rich products from grains. U.S. Pat. No. 5,135,765, for example, describes a process for producing a protein-rich product from brewer's spent grain containing germ, husks and a proteinaceous material. The process requires the use of high water content spent grain (e.g., at least about 65% water by weight), passing the wet spent grain through a mill to press and grind the solids, and then sieving the spent grain in water to produce an at least 50% by weight protein product. After formation of the first concentrate, the coarse fraction may be extracted with alkaline aqueous solution at elevated temperature to form an extract, and the extract is acidified to form a further concentrated protein rich precipitate.

It is well known that soy bean products may have undesirable taste components. These components are known to be reduced or removed by selection of unique varieties of soy beans for the original source, heating an intermediate soy bean product to reduce lipoxygenase, extraction with an aqueous solution, extraction with an alkali solution, extraction with a reducing agent (e.g., see U.S. Pat. No. 5,023,104), extraction with organic solvents (e.g., removal of chlorohydrins from hydrolyzed protein compositions in U.S. Statutory Registration No. H989) and extraction with high pressure or supercritical carbon dioxide (e.g., "Preparation and Evaluation of Supercritical Carbon Dioxide Defatted Soybean Flakes" A. C. Eldridge, et al., *Journal of Food Science*, Vol. 51, No. 3, 1986, pp. 584–587; "Off-Flavor Removal from Soy-Protein Isolate by Using Liquid and Supercritical Carbon Dioxide" JAOCS, Vol. 72, no. 10, 1995, pp. 1107–1115; "Emulsifying Properties of Low-fat, Low-cholesterol Egg Yolk Prepared by Supercritical $CO_2$ Extraction" *Journal of Food Science*, Vol. 61, No. 1, 1996, pp. 19–23 and 43; and U.S. Pat. No. 4,493,854 shows extraction of oil from soy (e.g., flakes) by $CO_2$ extraction, leaving extracted meal as a by-product. The purpose of the process is to improve the flavor of the soy products by removal of undesirable flavor materials in the soy product. The process in U.S. Pat. No. 4,493,854 produces an enhanced flavor oil by tempering the initial soy material with moisture and extracting oil from the tempered soy product, but the by-product of protein and other solids is not a significantly concentrated product and is not an isolate, as it would still contain the whey, sugars and other materials not extracted by the $CO_2$.

Bovine milk contains about 3 to 4% protein. The casein component of the bovine milk protein constitutes about 80% of the total protein. The remaining protein is divided among certain whey proteins with the principal one being .beta.-lactoglobulin.

It was recognized in antiquity that the casein protein of bovine milk could be separated from the "whey" fractions by in situ acidification of milk utilizing enzyme extracts or by the direct addition of acid to the milk. For the preparation of casein from milk, after skimming the cream off the top the milk is acidified either by the addition of acid or by an enzyme. Below about pH 4.7 the casein precipitates as "curd" leaving a clear liquid, the "whey".

In order to improve the heat sealability of edible films and thereby overcome the above-described disadvantages, a number of methods have been proposed. They include the method of forming a film from an intimate blend of amylose, an alkali metal salt of casein, and a low-molecular-weight plasticizer (Japanese Patent Laid-Open No. 112533/'76); the method of dipping a collagen film in, or coating it with, a mixture of gelatin or glue and a plasticizer (Japanese Patent Laid-Open No. 11280/'77); the method of forming a film by laminating a polysaccharide with gum arabic, pullulan, starch or gelatin (Japanese Patent Laid-Open No. 76336/ '85); and the method of incorporating a solid fat in an edible film (Japanese Patent Laid-Open No. 59855/'88).

However, the films formed from an intimate blend of amylose, an alkali metal salt of casein, and a low-molecular-weight plasticizer, the films formed by laminating a polysaccharide with gum arabic, pullulan or starch, and the edible films having a solid fat incorporated therein still fail to exhibit adequate heat sealability. The films formed by laminating a collagen film or a polysaccharide with gelatin show a marked improvement in heat-seal strength, but have the disadvantage that the presence of gelatin in the surface layer causes severe blocking of films and this makes it difficult to handle the films.

SUMMARY OF THE INVENTION

An edible, water-resistant composition that can be formed into shaped articles including film comprises a water-resistant solid composition of casein. The casein composition may be directly precipitated from a solution under high pressure treatment with carbon dioxide. The composition does not have to be crosslinked, but takes advantage of the natural water-insolubility of the protein backbone of the casein. The casein composition may be combined with edible or inert flexibilizers to improve film properties, and the film may be used to protect food products or food compositions, yet provide moisture protection.

DETAILED DESCRIPTION OF THE INVENTION

The terms water-insoluble, and substantially water-insoluble have specific meanings within the practice of the present invention. The term "water-insoluble" means that less than 2% of total weight of casein-based material is dissolved from a mass after immersion in deionized water at 20 degrees Celsius for two hours. The term "substantially water-insoluble" means that less than 10% of total weight of casein-based material is dissolved from a mass after immersion in deionized water at 20 degrees Celsius for two hours. The term "marginally water-insoluble" means that less than 25% of total weight of casein-based material is dissolved from a mass after immersion in deionized water at 20 degrees Celsius for two hours. "Casein-based" refers to materials within the film or composition that are casein or chemically derived from casein. Some materials of the invention may display substantial water insolubility of less than 15% of total weight of casein-based material being soluble or dissolved from a mass after immersion in deionized water at 20 degrees Celsius for two hours. Some materials of the invention may display water insolubility of less than 10% or less than 5% of total weight of casein-based material being soluble or dissolved from a mass after immersion in deionized water at 20 degrees Celsius for two hours. A material is casein-based if at least forty percent or at least fifty percent of its mass is casein. Usually the mass of the material is from about 45–90% casein (or casein-based material), more usually from about 50 to 80% by weight casein (or casein-based material), usually still more than 80%, or more than 85%, 90% or 95% casein (or casein-based material).

The process of the invention may be practiced to produce the novel casein materials (e.g., as a film) by using an initial pressure above the surface of the solution that is usually provided as a pressure of from about 400 to 1800 pounds per square inch (psi) to the solution/dispersion. If the pressure is increased to above 2000 psi for an extended period of time, the resulting casein-based product tends to be water-soluble. This is theorized to be a result of removal of Ca, Mg, $PO_4$, or citrate groups that normally bind the micelle together. The film may comprise a film of micelles in the integral structure of a film. The initial pressure in the vessel will usually be lower and the pressure may be increased at a desired rate. There is likely to be at least some $CO_2$ present in the gas over the surface of the solution in the vessel, but normal atmospheric $CO_2$ content would not be sufficient to effect the process of the present invention. The initial solution may also be pretreated to advance the process. For example, prior to the application of pressure in the vessel or even before introduction of the solution into the vessel, the solutions may be pretreated by heating the solution (e.g., from about 30 to less than 65 degrees Centigrade). The resulting supernatants would then be chilled before the $CO_2$ treatment. These are examples of advantageous but not essential types of pre-treatment steps in the practice of the present invention. Sufficient $CO_2$ should be introduced into the system to lower the pH below 7, preferably below about 6 and more preferably below about 5.5. Heating is performed either before, during or after the addition of the $CO_2$ into the system, or at a combination of these times. The heating is generally effected to provide a solution temperature of between 30 and less than 65° C. (e.g., 30 to 60° C.) for casein protein and may be varied as desired or applicable on an individual basis for the particular protein source selected. This heating also increases the pressure within the reaction vessel or system and assists in interactions between compounds.

Additional $CO_2$ may be added, reducing the pH of the solution further, often by at least 0.5 pH units. The $CO_2$ may be added to effect a supercritical state over the solution to assure the effectiveness and concentration levels of the carbonic acid in the solution. The final pH is generally below 5.5, more often above 5.0, as for example between 4.5 and 5.5 or between 5.0 and 5.3 (e.g., 5.1 or 5.2). The solution in the vessel or the solution within a continuous apparatus system is then held at these conditions for a time sufficient to assist in the solubilization of the protein.

The pressurized solution is then depressurized, removing the whey. The casein is removed from the reactor. Casein is then dried. The solution, when coated out and dried, forms a substantially water-insoluble film of casein. The coating out of the solution may be by casting, extruding, molding or other forming processes.

It is important to note that the present invention uses the carbonic acid in the solution to precipitate the protein in the solution during the pressurizing and heating. This is substantively different than the use of supercritical $CO_2$ to remove trace flavor materials as practiced in mere extraction processes. Extraction removes either desirable materials from a mass (so that the desirable materials, such as oils, may be collected) or removes minor amounts of undesirable materials from a mass (such as the removal of objectionable flavors from soy, as described above). Extraction processes, in fact, are usually performed on concentrates and isolates and reference is seldom if ever made to any further concentration of the solids, even though some minor increase of the percentage of protein in the solid product is likely to occur. Additionally, these extraction processes often act to remove materials which are soluble in the $CO_2$ rather than act to precipitate materials by a process where after adding the flakes, meal or flour to water there is a dissolution of the globulins and albumins into the water of the solution or dispersion.

When $CO_2$ is added to the milk, there is a drop in pH due to the formation of carbonic acid from the $CO_2$. The drop in pH causes a change in the solubility of the casein, precipitating from the solution, while whey proteins remain in the solution/dispersion. However, upon release of pressure, the pH returns almost to the original value of the solution/dispersion before introduction of the $CO_2$, and indication that most of the $CO_2$ has evolved. Therefore there are no contaminating salts in the product.

With regard to copending, commonly assigned application processes such as the whey process described in U.S. patent application Ser. No. 08/996,136, whey proteins are comprised of alpha-lactalbumin (alpha-La, about 30%) and beta-lactalbumin (about 50%), the rest being immunoglobulins (Igs), Bovine serum albumin (BSA), and proteose-peptones. An enriched fraction of alpha-La containing the alpha-La, Igs, BSA and proteose-peptones was isolated. The mechanism appears to be a combination of pH, heat, and possibly salt formation. The pH is initially lowered with $CO_2$ and probably causes a release of calcium from the alpha-La and changes the conformation of the protein. The calcium probably exists in solution as a bicarbonate. Addition of heat above 50° C., along with the depressed pH causes the alpha-La to form aggregates. The alpha-La most likely entraps the Igs, BSA and maybe the proteose-peptones. The aggregates may not necessarily get big enough to drop out of the whey solution/dispersion as a precipitate, so centrifugation or filtration (e.g., microfiltration) may be needed to remove them in this or a later step. In this case the heat does seem to foster aggregation, and may change the mechanical strength of the protein.

In U.S. Pat. No. 5,432,265, the casein precipitation process was used with $CO_2$ to demonstrate the fact that the process can operate under high pressure continuously. The present invention establishes that the apparatus described therein can be used as part of the present process. In the process of U.S. Pat. No. 5,432,265, the component being removed is casein, a protein product comprising proteins linked by calcium phosphate bonds. One of the first steps in the process of U.S. Pat. No. 5,432,265 is to break these bonds so that individual proteins are held in solution/dispersion. That process then adjusts the temperature of the solution/dispersion, causing the proteins to agglomerate, which may entrap some small amount of other solids and dissolved materials within the network of agglomerated proteins. This process is specifically temperature dependent and the proteins precipitate as agglomerated materials. In the present invention, there is little or no dissolving of calcium phosphate bonds to free proteins, there is little or no agglomeration of proteins, proteins precipitate by more traditional physical phenomena where the change in pH of the solution/dispersion causes decreased solubility of selected proteins, and those specific proteins (which fortuitously happen to be the desirable proteins) precipitate from the solution/dispersion, leaving other dissolved and carried materials within the solution/dispersion. The $CO_2$ controls the Ca-phosphate bonds rather than completely eliminating them.

With regard to the general extraction process patents described above, these mechanisms rely upon the differences in density between the oils and $CO_2$. At supercritical pressures of around 10,000 psi, $CO_2$ has a density and other properties that mimic those of a liquid solvent. At supercritical pressures of around 10,000 psi, $CO_2$ has a density that mimics a liquid solvent. The supercritical $CO_2$ also exhibits transport properties, such as viscosity and diffusivity, that mimic a gas. In operation, the practitioners typically pack a very small column with soy flakes (or other material), pressurize with $CO_2$, circulate the $CO_2$ through the column for a couple of hours to dissolve oil and establish equilibrium, and then crack open a valve to a flask. The rapid decrease in pressure causes the $CO_2$ to gasify and the oil previously carried by the $CO_2$ to precipitate into the flask. The flakes don't move continuously through the process, whereas in the present invention, where a continuous process would be performed, all solids and liquids would move. More importantly, in the extraction process, only the oil and essentially hydrocarbon soluble materials are absorbed into the supercritical gas stream, but there is no precipitation of protein from a solution/dispersion.

As used herein, unless otherwise noted, the wt-% of the components of the composition are based on the total dry weight of the composition.

Other Additives

Plasticizers. Preferably, the composition before molding may include about 9–20% water to provide a plasticizing effect to facilitate processing, preferably about 9–11 wt-% water for compression molding, or up to about 20 wt-% water for extrusion or injection molding. According to the invention, the molded article will contain about 4–5 wt-% water. In addition to water, a minor but effective amount of a compatible plasticizer may also be included in the composition to facilitate processing and increase flexibility of the molded article. It has been found that inclusion of a plasticizer such as glycerol, tends to increase flexibility, but decrease the tensile strength and increase the water absorption of the molded article. Therefore, it is preferred that, where desired, the composition include a minor amount of plasticizer of about 0.1–40 wt-%, preferably about 5–35 wt-%, based on the total solids weight of the composition. When using glycerol as the plasticizer, for example, the preferred range is between 20 and 30% by weight of plasticizer. For extrusion and injection molding, the composition may include up to about 45 wt-% plasticizer.

Plasticizers that may be used according to the invention, alone or in combination, include low molecular weight hydrophilic organic compounds such as di- or polyhydric alcohols and derivatives thereof, as for example, glycerol, glycerol monoacetate, diacetate or triacetate, polyglycerol, glycerol monostearate, sorbitol, sorbitan, mannitol, maltitol, ethylene glycol, diethyl glycol, propylene glycol, polyvinyl alcohol, and the like; sodium cellulose glycolate, cellulose methyl ether, and the like; triethyl citrate, and the like; and polyalkylene oxides such as polyethylene glycols, polypropylene glycols, polyethylene propylene glycols, polyethylene glycol fatty acid esters, and the like. Preferred plasticizers according to the invention are glycerol, glycerol monoacetate, glycerol monostearate, and polyglycerol. But plasticizers are preferred that are edible themselves, such as glycerol, mannitol, sorbitol, maltitol, gum arabic, and the like.

Lubricants. The composition may further contain a minor but effective amount of a lubricating agent to provide a lubricating effect, for example, by aiding in the release of the molded article from surfaces, to facilitate extrusion, and the like. Water-insoluble lubricants may also increase the water-resistance of the products. Examples of suitable lubricants that may be used in the compositions, either alone or in combination with another lubricant, include mono- and diglycerides, and fatty acids, preferably saturated fatty acids; phospholipids such as lecithin; phosphoric acid-derivatives of the esters of polyhydroxy compounds; vegetable oil, preferably hydrogenated forms; animal lipids, preferably hydrogenated forms to prevent thermal oxidation; and petroleum silicone and mineral oils. The amount of lubricant contained in the composition is preferably about 5 wt % or less, 2 wt-% or less, and more preferably about 0.1–1 wt-%, based on the total solids weight of the composition.

Extenders. Extenders, for example, water soluble polysaccharides such as methylcellulose, hydroxymethylcellulose, microcrystalline cellulose and cellulose fiber, and synthetic polymers such as poly(acrylic acids), poly(methacrylic acids), poly(vinyl acetates), poly(vinyl alcohol), and poly(vinyl acetate phthalate), may also be included in the composition. Preferably, an extender is included in the composition in an amount of about <50 wt-%, more preferably about 3–20 wt-%, based on the total solids weight of the composition.

Preservatives. A compatible antimicrobial agent such as a fungicide or bactericide may also be included in the composition in an amount effective to prevent growth of fungi, bacteria and the like, in or on the compositions or an article formed from the compositions. The antimicrobial agent should not induce undesirable interactions or chemical reactions between the components of the composition.

Antioxidants. The compositions may include a compatible antioxidant to retard oxidation and darkening of color of the composition during processing, such as by extrusion or molding at elevated temperatures. Suitable antioxidants include, for example, butylated hydroxyanisole (BHA), butylated hydroxytoluene (BHT), Irganox 1010, propyl gallate (PG), .alpha.-tocopherol (Vitamin E), and ascorbic acid preferably in the form of ascorbyl palmitate, and the like. The composition may include about 0.001–1% of an antioxidizing agent, preferably about 0.01–1%, preferably about 0.1–0.5%.

Colorants. The compositions may further include a coloring agent. Coloring agents, suitable for use in the present compositions include, for example, azo dyes such as Bismarck Brown 2R and Direct Green B; natural coloring agents such as chlorophyll, xanthophyll, carotene, and indigo; and metallic oxides such as iron or titanium oxides. The coloring agent may be included in the composition at a concentration of about 0.001 to 10 wt-%, preferably about 0.5 to 3 wt-%, based on the total solids weight of the composition.

Edible Compositions. The present casein-based compositions may be comprised entirely of ingredients that may be consumed at nontoxic levels by a human or other mammal. In that case, the article formed from the composition would be biodegradable as well as edible by a mammal. An edible composition according to the present invention, would comprise, for example, the casein protein combined with a compatible and edible solvent such as an aqueous alcohol or mildly alkaline aqueous solution (pH 8), and optional additives including, for example, a plasticizing agent such as glycerol, a lubricating agent such as lecithin and mono-or di-glycerides, an extender such as microcrystalline cellulose or cellulose fiber, an antioxidant such as ascorbic acid, and/or an antimicrobial agent such as methylparaben. An effective amount of an edible flavoring agent such as cocoa, vanillin, fruit extracts such as strawberry and banana, and the like, may also be included to enhance the taste of an edible composition. The composition may also be nutritionally reinforced, as for example by the inclusion of vitamins or minerals. The composition may also be ground and/or pelletized and used as animal feed.

Any food component may be coated, wrapped, packaged, sealed, skinned, cased or the like in the composition of the present invention with moisture resistance provided. The food component may comprise meat(s), vegetable(s), fruit(s),(supplement(s), fiber(s), vitamin(s) or mixtures thereof. The food component may be cooked, partially cooked, or raw. Ground meats comprising at least one of beef, lamb, turkey, chicken, pork and the like (with flavoring or dilutants added) are particularly suitable for use with the present invention.

Cucumber, carrot, spinach, cabbage, Japanese konjak and the like can be singly or taken together as the raw material of the bound-formed food of the present invention. Vegetables and fruits are, however, used very often together with proteinous raw materials, which results in their value added.

Furthermore, any solid foods such as bean, biscuit, cracker, caramel, chocolate, cake, rice snack, potato chip, cookie, pie, candy and the like can be raw food material for the production of bound-formed foods of the present invention.

The bound-formed foods produced from these raw materials include not only bound products of chicken, animal meat, fish meat and the like, which can be made into steak, and ham, sausage, hamburger steak, meat balls, Japanese kamaboko, Japanese chikuwa, Japanese hampen and the like, but also other bound-formed foods which are not known in the prior art, such as a product having a novel structure.

Materials and Methods

Materials. Carbon dioxide ($CO_2$)-precipitated casein was prepared as described previously (Tomasula et al., U.S. Pat. No. 5,432,265, issued 1995 and *J. Dairy Sci.*, Vol. 78, pp. 506–514, 1995) by injecting $CO_2$ into milk at 5520 kPa and 38° C. in a batch reactor. The reactor contents were held for 5 minutes. After precipitation, the casein was washed with distilled water to remove whey proteins, lactose, and minerals. The casein was then freeze-dried. Alanate 310 calcium caseinate (New Zealand Milk Products, Inc., Santa Rosa, Calif.) was used to make films for comparative purposes. Proximate analysis of the caseins was determined in our laboratory according to methods described previously (Tomasula et al., U.S. Pat. No. 5,432,265 et al., 1995). Glycerol (GLY), used as a plasticizer, was purchased from Aldrich Chemical Co. (Milwaukee, Wis.).

Film-Making Procedure. Aqueous solutions of 2, 4, 6, and 8% (w/w) $CO_2$-casein and Alanate 310 calcium caseinate were prepared. Twenty milliliters of each was then pipetted into 100 mm wide×15 mm high polystyrene Petri dishes (Fisher Scientific Co., Pittsburgh, Pa.) to cast films of the pure caseins.

Aqueous solutions with total GLY concentration and either Alanate 310 or $CO_2$-casein of 6% (w/w) were then prepared so that the resulting films contained either 20, 30, 40 or 50% (w/w) GLY. The solutions were stirred vigorously using a hand-held stirrer for 2 minutes. A light vacuum was applied to each solution to remove bubbles. Five films were cast from each solution. The films were allowed to dry overnight at ~23° C. and 50% relative humidity (RH) and then were stored in a desiccator at ~50% RH and 23° C. Storing the films at 50% RH prevents the films from shrinking, warping, or developing cracks and permits easy removal from the plates. RH was maintained in the desiccator using a saturated $NaHSO_4$ solution.

Thicker films were prepared from the same solutions containing either casein and 30% (w/w) GLY by pipetting ~28 mL of solution into a Petri dish and following the film-making procedure described above.

Film Thickness. A model 3 micrometer (B. C. Ames Co., Waltham, Mass.) was used to measure film thickness. Reported values of film thickness are the mean of 10 measurements selected randomly over the face of the film. The precision of the thickness measurements was ±5%.

Water Vapor Permeability (WVP) Measurements. The apparatus and method used to measure WVP have already been described (Parris et al., *J. Agric. Food Chem.*, Vol. 38(3), pp. 824–829, 1990). The method is based on ASTM E96-80 (ASTM, 1980) as modified by McHugh et al. (*J. Food Sci.*, 58:899–903, 1993). Four replicates each of $CO_2$-casein or Alanate 310 films containing 6% (w/w) total solids and 30% (w/w) GLY were tested. Air velocity was maintained at 150 m/min across the films. Temperature was controlled at 30±2° C. WVP for all films was determined with the shiny side down facing the vapor source.

Tensile Property Measurements. An Instron model 1122 tensile tester equipped with a 2000 g load cell was used to measure tensile strength (TS), elongation to break (ETB), and initial modulus (IM). Five replicates were run for each film composition using 5 mm wide specimens. A gauge length of 25 mm and an extension rate of 5 mm/min were used. Samples were stored at 50% RH for at least 24 h before testing. Standard deviation was calculated using version 6.0 of the Instron software. Scatter plots of the data were prepared using SigmaPlot 4.0 for Windows, Chicago, Ill.

Solubility Measurements. The procedure used to determine the solubility of the films in water is similar to that described in Gontard et al. (*J. Food Sci.*, 57, pp. 190–199, 1992). Water solubility was determined for $CO_2$-casein and Alanate 310 films containing 6% (w/w) total solids and either 0 or 30% GLY. A 4 cm diameter disk was cut from each of the films, weighed, and then immersed in water at room temperature for 24 h with stirring. The nondissolved film was then dried at 100° C. for 24 h and weighed. The percentage solubility was defined as the mass of casein in the film that dissolved divided by the initial mass of casein in the film. The experiments were performed in triplicate.

Scanning Electron Microscopy. Strips of dry films were immersed in 1% glutaraldehyde—0.1 M imidazole—HCl solution at pH 6.8 for 48 h at room temperature. After washing in imidazole buffer for 1 h, these strips were immersed in 2% $OSO_4$—0.1 M imidazole solution for 2 h, washed in distilled water, dehydrated in a graded series of ethanol solutions, and embedded in an epoxy resin mixture. Thin sections were cut with diamond knives, stained with solutions of 2% uranyl acetate and lead citrate, and examined in a model CM12 scanning transmission electron microscope (Philips Electronics, Mahway, N.J.) operated in the bright field mode at an instrumental magnification of 22000x.

Statistical Analyses. Microsoft Excel 97 SR-1 (Microsoft Corp., Redmond, Wash.) was used for all statistical analyses. The data were analyzed with ANOVA, and means were compared using the F test. Differences were considered to be significant at $P<0.05$.

Qualitative Film Properties. $CO_2$-casein and calcium caseinate films prepared from the protein solutions without added GLY were brittle. $CO_2$-casein films prepared from 2% (w/w) solutions were brittle and difficult to peel from the Petri dishes. Calcium caseinate films prepared from either the 2 or 4% (w/w) solutions were difficult to remove from the dishes. To facilitate comparison between the properties of the two films, the films were prepared from solutions containing 6% (w/w) total solids. Films prepared from 8% (w/w) solutions were qualitatively comparable to films prepared from the 6% (w/w) casein solutions. Only the calcium caseinate films were tested for tensile properties; they performed similarly to the films cast from 6% (w/w) solutions. These films were not subjected to water vapor barrier property testing or solubility testing. We limited our study to films prepared from the 6% (w/w) solutions because films prepared from solutions containing the least amount of protein are most desirable in commercial applications to keep costs low.

Films prepared from $CO_2$-casein were slightly milky in appearance, but transparent. The milky appearance may be due to the presence of intact casein micelles. Some of the $CO_2$-casein films dried to almost a matte surface. The calcium caseinate films were transparent and had smoother surfaces. Added plasticizer did not affect the appearance of the films. The $CO_2$-casein films appeared to have more "depressions", which were almost pore-like, compared to the caseinate films. The surface depressions in both films may be a result of localized phase separations during drying of the film. Observation by SEM photographs indicates that the casein micelles in the calcium caseinate films (A) are large and randomly distributed throughout the film.

TABLE 1

Proximate Analysis of $CO_2$-Casein and Commercial Calcium Caseinate (Reported on Moisture-Free Basis)

| casein | ash (%) | protein (%) | fat (%) | lactose (%) | Ca (%) | P (%) | Na (%) |
|---|---|---|---|---|---|---|---|
| $CO_2$-casein | 3.89 | 94.1 | 1.52 | 0.5 | 1.6 | 0.5 | 0.2 |
| calcium caseinate[a,b] | 4.44 | 92.3 | 0.5 | 2.7 | 1.6 | 0.3 | 0.8 |
| calcium caseinate[a,c] | 4.3 | 94.5 | 1.1 | 0.1 | 1.3 | 0.8 | 0.2 |

[a]Alanate 310, New Zealand Milk Products, Inc. (Santa Rosa, CA).
[b]Analysis performed in our laboratory.
[c]Analysis supplied by the manufacturer.

Casein micelles in the $CO_2$-casein films (B) are much smaller and located in a more ordered arrangement. The smaller micelles in the $CO_2$-casein can be attributed to the higher precipitation pH, which was sufficient to disrupt only some of the larger micelles.

Results of the proximate analyses of the $CO_2$-casein and the calcium caseinate used in this study are shown in Table 1. Analytical results obtained in our laboratory for the two caseins showed equivalent amounts of calcium. Calcium caseinate contains ~60% as much phosphorus as does $CO_2$-casein.

Tensile Properties. Tensile Properties for blends of $CO_2$-casein and calcium caseinate films with GLY (average film thickness=0.15 mm) are plotted in FIG. 3. Films containing 0 and 10% GLY were too brittle for testing. Tensile strength (TS), elongation to break (ETB), and initial modulus (IM) were determined. ETB is a measure of the flexibility of the film, and IM is a measure of the stiffness of the film.

For both films, TS decreased with increasing GLY content. At 20% (w/w) GLY content, TS was >30% greater for the $CO_2$-casein films, but the difference in TS decreased with increasing GLY content. There was no significant difference between the values of ETB for the $CO_2$-casein films and calcium caseinate films over the entire range of GLY content. The values of ETB dropped with GLY content >40%. IM for the $CO_2$-casein films is greater than IM for the calcium caseinate films over the entire range of added GLY.

TS results for both films are in general agreement with the values listed in Chen (*J. Dairy Sci.*, 78, pp. 2563–2583, 1995) for caseinate films containing GLY. TS values for other protein film types are also of similar magnitude (Gnanasambandam et al., *J. Food Sci.*, 62, pp. 395–398, 1997; Ghorpade et al., supra, 1995).

TABLE 2

Variation of Tensile Properties with Film Thickness for $CO_2$-Casein and Calcium Caseinate Films Containing 30% (w/w) Glycerol

| film type | film thickness (mm) | TS* (MPa) | ETB* (%) | IM* (MPa) |
|---|---|---|---|---|
| $CO_2$-casein | 0.11 | 1.2$^a$ | 50.2$^a$ | 9.6$^a$ |
| | 0.15 | 3.0$^b$ | 74.2$^a$ | 40.9$^b$ |
| calcium caseinate | 0.11 | 1.6$^{ac}$ | 66.6$^a$ | 10.8$^a$ |
| | 0.15 | 1.9$^c$ | 76.0$^a$ | 8.9$^a$ |

*Within each category, means with no superscript in common are significantly different ($P < 0.05$). TS = Tensile Strength. ETB = Elongation To Break. IM = Initial Modulus.

TABLE 3

WVP Values of $CO_2$-Casein and Calcium Caseinate Films Containing 30% (w/w) Glycerol

| film type | average thickness (mm) | RH (%) | film swelling | WVP* (g.mm/kPa.h.m$^2$) |
|---|---|---|---|---|
| $CO_2$-casein | 0.112 | 85.8 | No | 2.22$^a$/(1.90) |
| | 0.163 | 87.7 | No | 2.58$^b$/(2.22) |
| | 0.184 | 87.9 | No | 3.21$^c$/(2.80) |
| | 0.277 | 89.7 | No | 3.80$^d$/(3.41) |
| Ca caseinate | 0.171 | 86.5 | Yes | 3.18$^e$ |
| | 0.222 | 85.5 | Yes | 4.45$^e$ |

*Values in parentheses for the $CO_2$-casein films were calculated without the water vapor permeability (WVP) correction factor of McHugh et al. (1993). Within each category, means with no superscript in common are significantly different ($P < 0.05$).

The differences in the tensile properties of the two films, especially at lower GLY content, may be related to the manner in which calcium and phosphorus are bound to the caseins. $CO_2$-casein is precipitated at pH 5.4 (Tomasula et al., U.S. Pat. No. 5,432,265 et al., 1995) instead of the isoelectric pH 4.6 used to isolate acid casein. The higher precipitation pH is associated with higher calcium content. Because aggregates are formed at this pH, it is assumed that some of the micellar calcium phosphate, which maintains the casein micelle structure, is dissolved in the whey. In acid casein manufacture, most of the micellar calcium phosphate dissolves. Commercial calcium caseinate is made by dissolving acid casein in water followed by the addition of calcium hydroxide to replace calcium. The casein coagulate is broken down upon addition of calcium hydroxide, weakening hydrophobic protein interactions. $CO_2$-casein film may be stronger because more of the micellar calcium and phosphate linkages are intact. It was concluded that the functional properties of $CO_2$-casein differ from those of calcium caseinate most likely because of the manner in which calcium and phosphorus are associated with the caseins (Strange et al., *J. Dairy Sci.*, 81, pp. 1517–1524, 1998).

The flexibility of the films is not significantly different over the entire range of GLY content. ETB for the $CO_2$-casein film declined with GLY content >30% and for the calcium caseinate film declined with GLY content >40%. GLY reduces intermolecular forces in films by inserting itself between the protein chains. There may be an electrostatic attraction between calcium and the hydroxyl groups of GLY. GLY may also establish hydrogen bonding with amino acid residues of casein.

Tensile properties of polymeric films are not affected by film thickness. In our study, small but significant differences in TS and IM were noted with increasing film thickness, as shown in Table 2. For the $CO_2$-casein films, TS increased slightly with increasing film thickness. ETB for both film types did not vary with the change in film thickness. IM for the $CO_2$-casein film increased with film thickness but did not vary significantly for the calcium caseinate film. Differences are most likely an artifact of making and drying the films in Petri dishes and possibly would not be observed if the film were made in a different manner. All films had the same surface area exposed to 50% RH, but the thicker films took longer to dry, as expected. As the films were drying, it was observed that film formed and adhered to the sides of the Petri dishes while the rest of the film was reduced in height by evaporation. The height of the film was approximately evenly reduced from its center to its perimeter. The films shrank away from the sides of the dish when dry, with some puckering observed at the edges of the films. This drying pattern may have affected the distributions of protein, glycerol, and water molecules, leading to the small differences in measured tensile properties.

The tensile properties of the casein films may be considered moderate (10–100 MPa) at the lower end of added GLY, in comparison to low-density polyethylene films (Krochta and De Mulder-Johnston, *Food Techno.*, 51, pp. 61–74, 1997). ETB is close to that observed in oriented polypropylene films with ETB of 60%.

Water Vaper Permeability (WVP). WVP was determined for $CO_2$-casein and calcium caseinate films containing 30% (w/w) GLY. The values are reported in Table 3 for various film thicknesses. The WVP correction factor (McHugh et al., 1993) was used to correct for the effect of the water vapor partial pressure gradient in the stagnant air layer of the test cup. WVP for the $CO_2$-casein films was also calculated using ASTM Method E96 with the assumption of 100% RH (values shown in parentheses). WVP values for the $CO_2$-casein films were less than those for the calcium caseinate films at a particular film thickness. As shown in Table 3, the increased WVP for calcium caseinate films is accompanied by a smaller RH inside the test cup. The decreased RH is due to absorption of water by the protein, resulting in swelling of the film. $CO_2$-casein films did not swell-an indication of greater resistance to moisture mass transfer. Differences in the WVP properties may be attributed to the more rigid structure of the $CO_2$-casein films.

Both films show an increase in WVP with increasing thickness that is indicative of hydrophilic films (McHugh et al., supra, 1993; Ghorpade et al., *Trans*, ASAE, 38, pp. 1805–08, 1995). However, the effects are not as pronounced as they are in McHugh et al. (Supra, 1993) because the films in this study are thicker and the resulting RH covers a narrow range. WVP values are more likely a result of structural differences. WVP is not a function of film thickness for hydrophobic films.

WVP values reported in this study are greater than those reported by Avena-Bustillos and Krochta (*J. Food Sci.*, 58, pp. 904–907, 1993) for calcium caseinate films with approximately half the thickness.

Water Solubility. Water solubility was determined for various casein films, with and without 30% added GLY plasticizer. Results are reported in Table 4. Calcium caseinate films were easily dispersed in water. Upon dispersal in water, the $CO_2$-casein-based films showed no loss of integrity but changed from a transparent film to white and developed some tackiness. The whitening of the films is because of the clustering of the casein proteins due to the repulsion of water molecules. When the films were vigorously stirred, they broke up but did not dissolve further. The films did not whiten during the WVP studies, though.

TABLE 4

Water Solubility of $CO_2$-Casein Films and Comparison to Other Protein Films

| protein film | water solubility (%) | reference |
|---|---|---|
| $CO_2$-casein | 7.1 | this study |
| $CO_2$-casein-30% GLY | 16.8 | this study |
| calcium caseinate | 90.0 | this study |
| calcium caseinate-30% GLY | 100 | this study |
| soy film | 37.7 | Ghorpade et al. (1995) |
| rice bran films | | Gnanasambandam et. al. (1997) |
| pH 9 | 11 | |
| pH 3 | 9 | |

The increased solubility for the films containing GLY appears to be due to the presence of the plasticizer, because both films have about the same protein content. The presence of the plasticizer, in the range of 0–30% GLY, does not appear to significantly increase the solubility of the protein as seen by Stuchell and Krochta (1994) for edible soy films or by Mahmoud and Savello (*J. Dairy Sci.*, 76, pp. 29–35, 1993) for whey films.

The results are compared to the solubilities of other protein film types reported in the literature in Table 4. The water solubility of the $CO_2$-casein film is comparable to that for rice bran films with GLY added as plasticizer (Gnanasambandam et al., 1997).

Casein produced by sparging (scattering the bubbles during introduction) $CO_2$ into milk forms strong films that are highly hydrophobic. The properties are most likely a result of precipitation at a higher pH, which leaves some of the micellar calcium phosphate structure intact, and the higher precipitation temperature, which may increase protein-protein interactions as well. $CO_2$ films with added GLY plasticizer are stronger and stiffer than similar calcium caseinate/GLY films but have lower WVP and water solubility. The hydrophobic nature of these films may recommend them for uses that require better strength and moisture resistance.

What is claimed:

1. An edible film comprising carbon dioxide-precipitated casein that is free of crosslinking, wherein the casein has a solubility in deionized water at 20° C. of less than 25% by weight after two hours of immersion of the film in the deionized water.

2. The film of claim 1 wherein the casein has a solubility of less than 20% by weight after two hours of immersion of the film in the deionized water.

3. The film of claim 1 wherein the casein has a solubility of less than 10% by weight after two hours of immersion of the film in the deionized water.

4. A food component that has a protective film cover comprising the film of claim 1.

5. A food component that has a protective film cover comprising the film of claim 2.

6. A food component that has a protective film cover comprising the film of claim 3.

7. The edible film of claim 1, wherein said casein is present in the film in an amount of at least 40% by weight.

8. The edible film of claim 1, wherein said casein is present in the film in an amount of at least 75% by weight.

* * * * *